(No Model.)
LE ROY S. WHITE.
ELECTRIC MOTOR.
No. 419,808. Patented Jan. 21, 1890.
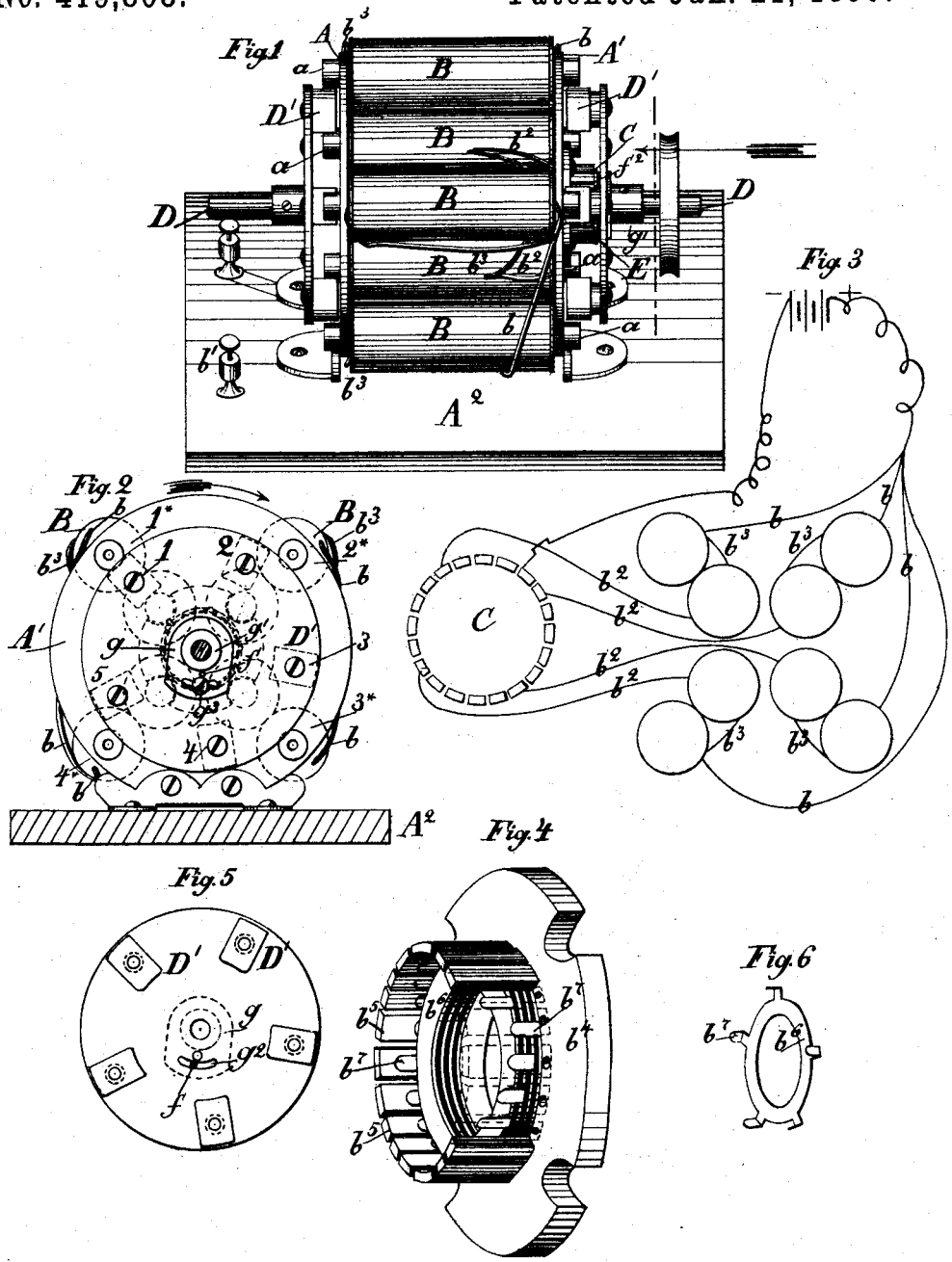
Witnesses:
Fr. Bergengren
O. Sundgren
Inventor:
LeRoy S. White
by his Attorneys,
Brown & Griswold

UNITED STATES PATENT OFFICE.

LE ROY S. WHITE, OF WATERBURY, CONNECTICUT.

ELECTRIC MOTOR.

SPECIFICATION forming part of Letters Patent No. 419,808, dated January 21, 1890.

Application filed November 13, 1888. Serial No. 290,670. (No model.)

*To all whom it may concern:*

Be it known that I, LE ROY S. WHITE, of Waterbury, in the county of New Haven and State of Connecticut, have invented a new and useful Improvement in Electric Motors, of which the following is a specification, reference being had to the accompanying drawings.

I will describe in detail an electric motor embodying my improvement, and then point out the novel features in claims.

In the accompanying drawings, Figure 1 is a side elevation of an electric motor embodying my improvement, partly in perspective. Fig. 2 is an end view taken in the direction of the arrow in Fig. 1. Fig. 3 is a diagrammatic view showing the mode of connecting up the field-magnet coils. Fig. 4 is a perspective view, on an enlarged scale, of the commutator, portions of the commutator being shown in dotted outline. Fig. 5 is a plan view of one of the armature-plates, showing the arrangement of the armature thereon. Fig. 6 is a view of one of a number of connecting-pieces employed in the commutator. Fig. 7 is a detail view of a commutator-brush employed in my improvement.

Similar letters of reference designate corresponding parts in the several figures.

A A' designate the frame of the motor, shown as of circular form and secured to a base $A^2$, preferably of wood. Between the portions A A' of the frame are secured bobbins or coils B, constituting the field-magnets of the motor. They are shown as thus secured by passing the ends of the cores $a$ of the bobbins through suitably-formed apertures in the portions A A' of the frame. As shown, the end portions of the cores extend wholly through the portions A A' and beyond the exterior surfaces thereof. The bobbins B are arranged in pairs—that is to say, in the operation of the motor pairs of positively and negatively charged bobbins always co-operate and the same pair of bobbins always act together. In the example of my improvement shown the bobbins of each pair are in proximity to each other, one bobbin of each pair being arranged just inward of the other. I have shown four pairs of bobbins arranged about equally distant from each other. In this example, also, I have shown one end of all the outer coils of each pair as connected with the positive pole of the battery or other source of electricity, such connection being made by insulated wires $b$, extending from the outer coil of the bobbins and connected together beneath the motor, from which connection may lead a wire to a binding-post $b'$. One end of all the inner coils of the pairs are connected by means of wires $b^2$ with a commutator C. In this arrangement I prefer, also, to connect the bobbins of each pair together. I have shown them as so connected by wires $b^3$. The mode of connecting up the bobbins together and with a battery or other source of electricity is shown more clearly in the diagrammatic view, Fig. 3. All the bobbins are stationary.

As previously stated, each of the bobbins is connected with a commutator. The commutator with which these coils connect is shown more clearly in Fig. 4. It consists of a number of separate metallic strips $b^5$, having their rear ends secured in a piece of insulating material $b^4$ and arranged in the form of a circle. In this example of my improvement I have shown twenty of the strips $b^5$. I divide the same into sets or groups of five strips to the set, and the strips of each set are electrically connected. There are thus four separate sets, each set being connected to a pair of field-bobbins. The means I have shown for connecting up the several strips of each set consist of ring-shaped pieces of metal $b^6$, one of which is shown more clearly in Fig. 6. These pieces of metal are provided circumferentially with lips or lugs $b^7$, which lips or lugs extend in a direction approximately parallel with the axis of the ring. It will be observed that these lips or lugs are formed upon the ring-shaped pieces at approximately-equal distances apart. The rings are of such diameter that they will fit within the circle of metallic strips $b^5$, and when within the circular strips the five lugs upon each of the rings will bear against five of the strips $b^5$, thus forming a metallic connection between five of the strips located at five approximately equidistant points in circle. The five strips thus connected constitute what I term a "set." In this example of my improvement, there being twenty of the strips $b^5$, and each of the ring-shaped metal pieces $b^6$ making contact with five of the strips, there will of course be four sets. Each of these sets, as previously stated, is connected by means of a wire $b^3$ with one of the pairs of bobbins. Each of the wires $b^2$ is, however, connected with but one of the strips of the set co-operating with a given pair of bobbins. It will be seen more clearly in Fig. 4 that the ring-shaped connecting-pieces $b^6$ are insulated from each other and arranged within the circular strips $b^5$, one beyond the other, and are so adjusted that the lugs $b^7$ upon the connecting-pieces contact in regular order of succession with the strips $b^5$, or, in other words, so that five different strips will be comprised in each of the sets. I prefer that the lugs $b^7$ should be secured by solder to the strips $b^5$.

D designates a main or driving shaft. In this example of my improvement I have shown two armature plates or holders secured upon said shaft and adapted to rotate therewith. Upon each of these armature-plates is secured a number of armatures D'. The construction of the armature-plates and the arrangement of the armatures thereon are shown more clearly in Fig. 5. It will be observed that the armature-plates are of circular form and that each plate has mounted upon it an odd number of armatures, in this instance five. Each of the armatures consists of a piece of metal secured to the armature-plate, as shown, by screws. By an examination of Fig. 2, wherein the armatures are shown in dotted outline, it will be seen that the arrangement of the armatures is such that they are equidistant apart, and that when any one of the armatures is within the magnetic field of a pair of bobbins the other of said armatures have been moved beyond the cores of all the other bobbins. Assuming that the armatures are rotating in the direction of the arrow in Fig. 2 and that the armature No. 1 has been attracted by a pair of bobbins 1*, it will be seen that the armature 2 is in a position to be readily attracted by the pair of bobbins 2*, which pair of bobbins will be energized next in order after the pair of bobbins 1*. When the armature 2 has been attracted by the bobbins 2*, the armature 3 will be in a position to be attracted by the bobbins 3*. When the armature 3 has been attracted by the bobbins 3*, the armature 4 will be in a position to be attracted by the bobbins 4*, and when the armature 4 has been attracted by the bobbins 4* the armature 5 will be in a position to be attracted by the bobbins 1*. Thus the armatures are successively attracted, and whichever armature is undergoing attraction the next adjacent armature in the direction of rotation will be in a position to be next attracted. As there are five armatures on each of the armature-plates and each armature is attracted by each of the four pairs of bobbins during a single rotation of the armature-shaft, it will be apparent that twenty separate pulls or impulses are given to the armatures during each complete rotation of the armature-shaft.

I have previously stated that each set of commutator-strips $b^5$ is connected to a different pair of the field-bobbins. In order to insure a more perfect closing of the circuit on the bobbins, I employ a commutator-brush of peculiar construction and operation. This brush consists of a metallic disk E. (Shown more clearly in Fig. 7.) This disk is provided centrally with an aperture $e$ and circumferentially with radial projections $e'$. These projections are approximately equidistant, and are disposed about the disk in position corresponding to the positions of the lugs or lips $b^7$ upon the metal connecting-pieces $b^6$. When the brush is in position, the projections $e'$ thereon bear against the outer ends of the strips $b^5$ of the commutator, and, being five in number, when moved into a position where they will contact with five of the strips $b^5$, they will necessarily close circuit through the strips and through the metallic connecting-piece $b^6$, contacting with said strips upon one of the pairs of bobbins. As the brush is rotated so as to bring the projections $e'$ successively into contact with the strips $b^5$, it will be apparent that the pairs of field-bobbins will be successively energized and de-energized in regular rotation.

As there are five of the projections $e'$ which may operate to close circuit upon four different sets of the commutator-strips, and each set of strips operates to energize four sets of bobbins, it follows that each pair of bobbins will be alternately energized and de-energized five times during a complete rotation of the brush. The brush in this example of my improvement is not secured directly to the armature-shaft, but its rotation is effected by one of the armature-plates, through which extends a pin $f$, which pin engages a notch $f'$ in the brush. Between the brush and the commutator-plate is arranged a spring $f^2$, likewise rotating with the armature-plate, by which the brush is held against the ends of the strips $b^5$ with a yielding pressure. It will be observed that the pin $f$ has its outer end secured in a plate $g$, which plate is provided with an aperture, through which extends a hub $g'$ upon that one of the armature-plates shown in Fig. 2. The plate $g$ may be rotated about the hub $g'$ independent of the armature-plate. The pin $f$ extends through a circular slot $g^2$ in the armature-plate. As the pin $f$ engages the notch $f'$ in the brush E, it will be apparent that when the plate $g$ is rotated the pin $f$ will cause rotary movement to be imparted to the brush. In this way the brush may be adjusted into proper position relatively to the strips $b^5$. When properly adjusted, the plate $g$ may be secured by means of a set-screw $g^3$, engaging a curved slot in the plate $g$.

I have illustrated two armature-plates, upon which two sets of armatures are arranged. It is not wholly essential, however, to the operation of the motor that two sets of armatures should be employed. Where two sets are employed, it is of course to be understood that the armatures of the two sets will be opposite each other, and corresponding armature of the sets will coact simultaneously with each of the pairs of bobbins; nor do I wish to be understood as limiting myself to the use of an odd number of armatures and an even number of pairs of bobbins, because this might be reversed.

What I claim as my invention, and desire to secure by Letters Patent, is—

1. In a motor, the combination, with a number of field-bobbins and an armature, of a commutator composed of a multiplicity of separate strips, certain of said strips being connected together electrically to form sets, each of said sets being connected electrically with one of the field-bobbins, and a rotary brush provided with a number of contact-points contacting with the ends of said strips and adapted to successively bring the sets of commutator-strips into circuit and to successively energize the field-bobbins, substantially a specified.

2. In an electric motor, the combination, with stationary field-bobbins arranged in pairs, of an armature revolving about a common axis in proximity to said pairs of bobbins and a commutator composed of a multiplicity of separate strips, certain of said strips being connected together electrically to form sets, each of said sets being connected electrically with a pair of the field-bobbins, and a rotary brush provided with a number of contact-points contacting with the ends of said strips and adapted to successively bring the several sets of commutator-strips into circuit and successively energize the pairs of field-bobbins, substantially as specified.

LE ROY S. WHITE.

Witnesses:
FREDK. HAYNES,
JOHN BICKET.